US007136821B1

(12) United States Patent
Kohavi et al.

(10) Patent No.: US 7,136,821 B1
(45) Date of Patent: Nov. 14, 2006

(54) METHOD AND APPARATUS FOR THE COMPOSITION AND SALE OF TRAVEL-ORIENTED PACKAGES

(75) Inventors: Itai Kohavi, Hod-Hasharon (IL); Yosh Bar-David, Sharon Tichon (IL)

(73) Assignee: Neat Group Corporation (IL)

( * ) Notice: Subject to any disclaimer, the term of this patent is extended or adjusted under 35 U.S.C. 154(b) by 0 days.

(21) Appl. No.: 09/551,519

(22) Filed: Apr. 18, 2000

(51) Int. Cl.
*G06Q 10/00* (2006.01)
(52) U.S. Cl. .......................................................... 705/5
(58) Field of Classification Search .................... 705/5, 705/6
See application file for complete search history.

(56) References Cited

U.S. PATENT DOCUMENTS

| | | | |
|---|---|---|---|
| 4,862,357 A * | 8/1989 | Ahlstrom et al. ............... | 705/6 |
| 5,006,978 A | 4/1991 | Neches | |
| 5,058,044 A | 10/1991 | Stewart et al. | |
| 5,193,056 A | 3/1993 | Boes | |
| 5,237,499 A | 8/1993 | Garback | |
| 5,253,166 A | 10/1993 | Dettelbach et al. | |
| 5,270,921 A | 12/1993 | Hornick | |
| 5,404,291 A | 4/1995 | Kerr et al. | |
| 5,452,450 A | 9/1995 | Delory | |
| 5,570,283 A | 10/1996 | Shoolery et al. | |
| 5,581,756 A | 12/1996 | Nakabayashi | |
| 5,604,898 A | 2/1997 | Saijyo et al. | |
| 5,615,269 A | 3/1997 | Micali | |
| 5,682,525 A | 10/1997 | Bouve et al. | |
| 5,696,898 A | 12/1997 | Baker et al. | |
| 5,724,575 A | 3/1998 | Hoover et al. | |

(Continued)

FOREIGN PATENT DOCUMENTS

EP  0 507 110 A3  10/1992

(Continued)

OTHER PUBLICATIONS

Business Editors; United Connection unveils SuperShopper feature with new 2.0 release; Oct. 1996; Computers/Electronics & Travel Writers; dialog 2 pages.*

(Continued)

*Primary Examiner*—Thomas A. Dixon
(74) *Attorney, Agent, or Firm*—Lerner, David, Littenberg, Krumholz & Mentlik, LLP

(57) ABSTRACT

A centralized travel packaging system retrieves available vendor offered travel products from airline, hotel, car rental companies, etc., as well as associated pricing, time restrictions, use restrictions, class, availability, rules, and description(s). Travelers, agents and distributors search the centralized travel packaging system for possible package matches based on the traveler's criteria. The system compiles packages either in advance or interactively with the requestor using an intelligent matching mechanism retained within the centralized travel packaging system. The matching method uses requestor criteria and additional criteria such as geographic distributions, type of product, time considerations, cost, defined restrictions, expert travel packaging knowledge base, and distribution channel limitations to match vendor offered travel products. Upon selection of a package, the system processes the request for purchase to include cost determination, commission schedules and payment. Packages are reformulated if offered products become unavailable or restrictions or traveler criteria change. Vendors of travel products are able to control available inventory by submitting travel product offerings with restrictions for consideration in the centralized travel packaging system.

9 Claims, 12 Drawing Sheets

U.S. PATENT DOCUMENTS

| | | | |
|---|---|---|---|
| 5,732,398 A | | 3/1998 | Tagawa |
| 5,734,838 A | | 3/1998 | Robinson et al. |
| 5,737,592 A | | 4/1998 | Nguyen et al. |
| 5,809,144 A | | 9/1998 | Sirbu |
| 5,832,451 A | | 11/1998 | Flake |
| 5,839,114 A | * | 11/1998 | Lynch et al. ............ 705/5 |
| 5,864,840 A | | 1/1999 | Leung et al. |
| 5,870,733 A | | 2/1999 | Bass et al. |
| 5,897,620 A | | 4/1999 | Walker |
| 5,924,082 A | | 7/1999 | Silverman |
| 5,941,947 A | | 8/1999 | Brown et al. |
| 5,948,040 A | | 9/1999 | DeLorme |
| 6,018,715 A | | 1/2000 | Lynch |
| 6,023,679 A | | 2/2000 | Acebo |
| 6,035,288 A | | 3/2000 | Solomon |
| 6,055,519 A | | 4/2000 | Kennedy et al. |
| 6,085,178 A | | 7/2000 | Bigus et al. |
| 6,119,094 A | * | 9/2000 | Lynch et al. ............ 705/5 |
| 6,304,850 B1 | | 10/2001 | Keller et al. |
| 6,332,135 B1 | | 12/2001 | Conklin et al. |
| 6,370,544 B1 | | 4/2002 | Krebs et al. |
| 6,377,932 B1 | * | 4/2002 | DeMarcken |
| 6,385,604 B1 | | 5/2002 | Bakalash et al. |
| 6,442,566 B1 | | 8/2002 | Atman et al. |
| 6,466,941 B1 | | 10/2002 | Rowe et al. |
| 6,839,679 B1 | * | 1/2005 | Lynch et al. ............ 705/5 |

FOREIGN PATENT DOCUMENTS

| | | |
|---|---|---|
| EP | 507 110 A2 | 10/1992 |
| EP | 0 624 964 A1 | 11/1994 |
| EP | 0 748 095 A2 | 12/1996 |
| EP | 0 748 095 A3 | 12/1996 |
| EP | 843286 A2 | 5/1998 |
| WO | WO 97/15008 | 4/1997 |
| WO | WO 97/32268 | 9/1997 |
| WO | WO 97/44745 | 11/1997 |
| WO | WO 98/44438 | 10/1998 |
| WO | WO 01/61568 A2 | 8/2001 |
| WO | WO 01/69506 * | 9/2001 |

OTHER PUBLICATIONS

Son, Hugh; Going Places; Apr. 9, 2000; New York Daily News; p. 3; proquest copy 2 pages.*

Bookit I Pro (webventures.com/bookitpro) website, Mar. 24, 2000.

Worldspan (worldspan.ro) website, Mar. 24, 2000.

Byebyenow.com (byebyenow.com) website, Mar. 24, 2000.

Internetview 2.0 (itatn.com) website, Mar. 24, 2000.

Genesys- The Travel Technology Consultancy (genesys.net) website, Mar. 24, 2000.

Affinity Solutions (ngcan.com/affinity) website, Mar. 24, 2000.

NTS Travel Response (ntstravel.com/companyoverview) website, Mar. 24, 2000.

IONA Pressroom (iona.dom/pressroom/archive/vti.html) website, Mar. 24, 2000.

S2 Systems News (s2systems.dom/pages/news/releases/news_netx.htm) website, Mar. 24, 2000.

* cited by examiner

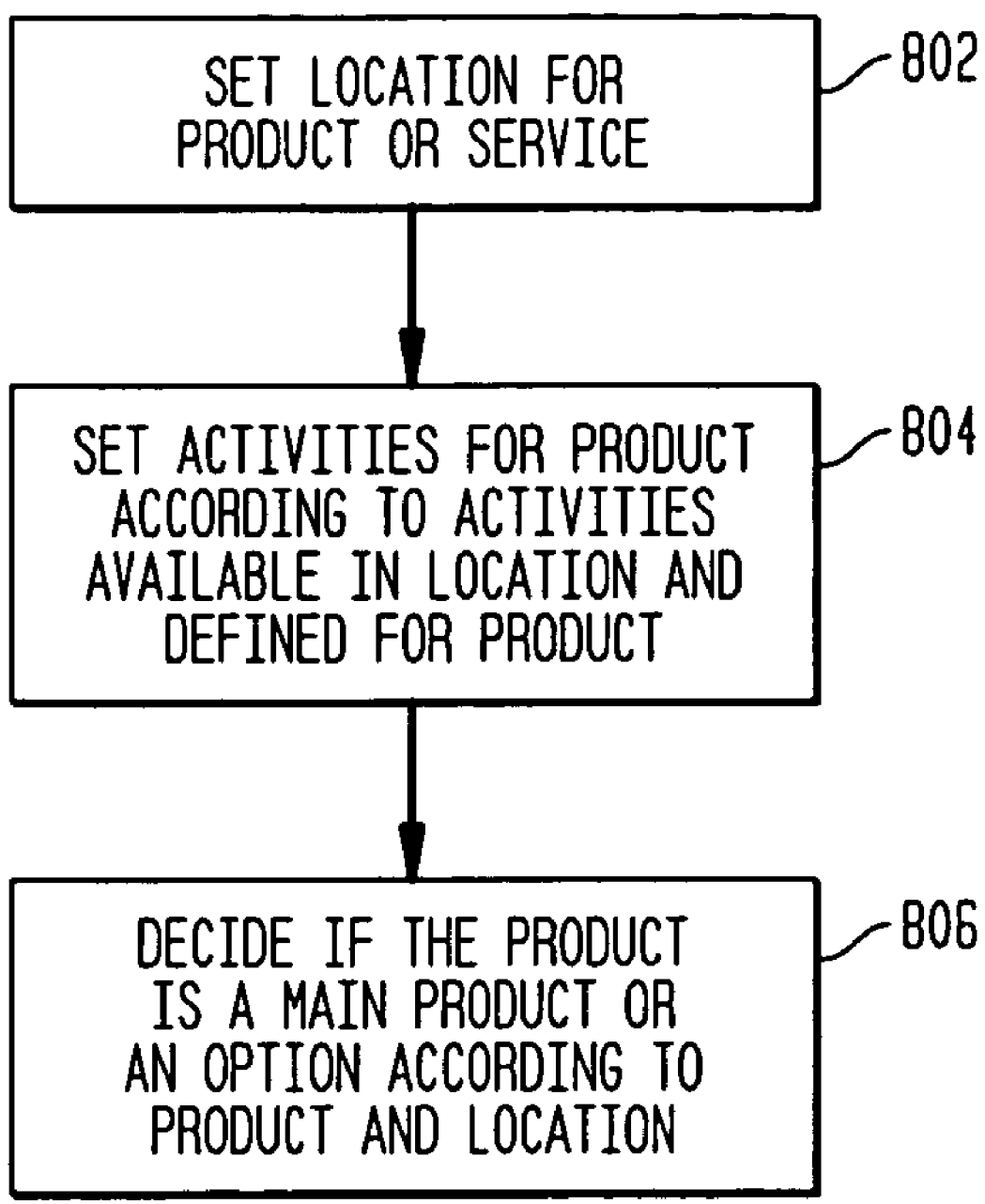

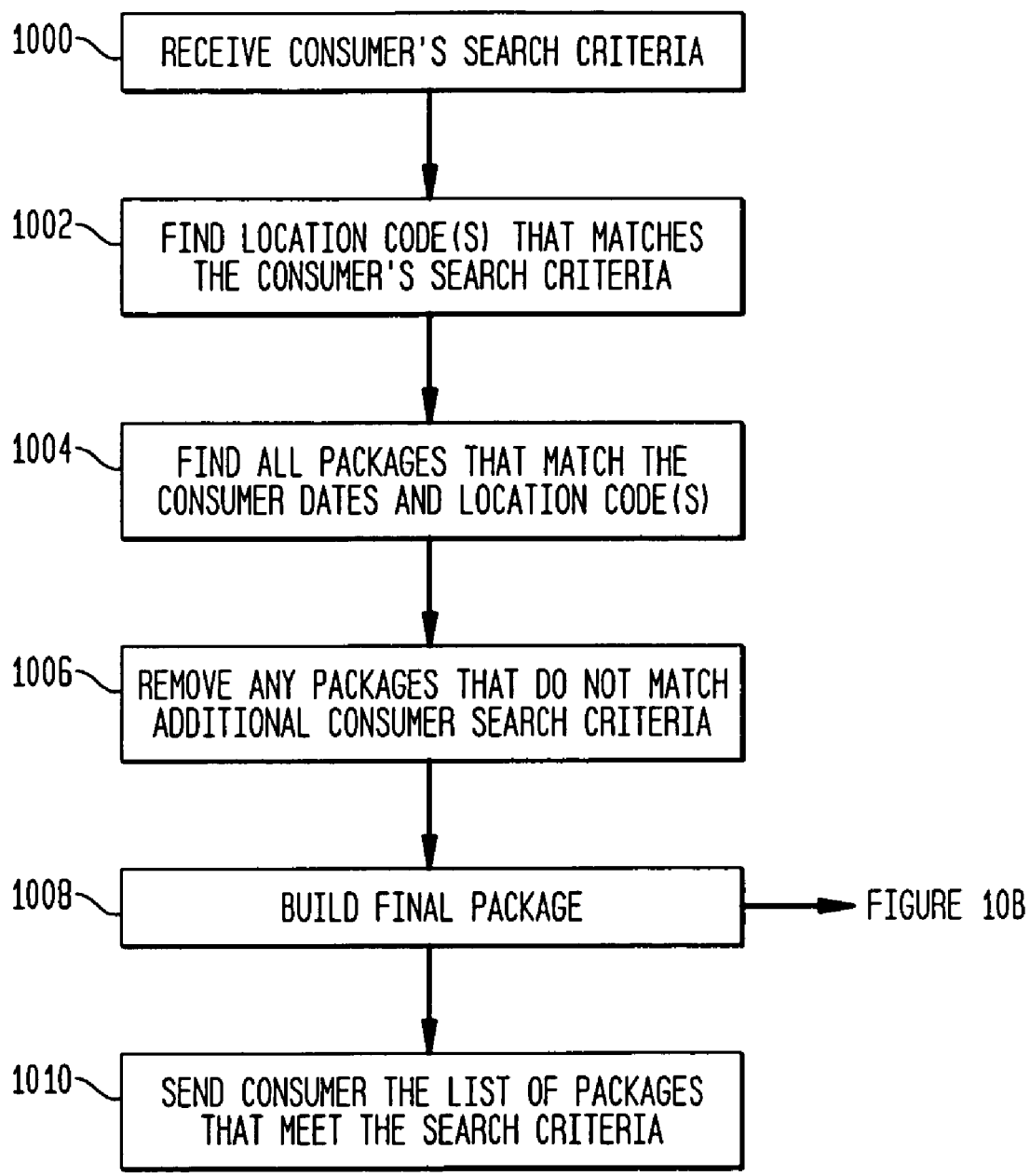

METHOD AND APPARATUS FOR THE COMPOSITION AND SALE OF TRAVEL-ORIENTED PACKAGES

BACKGROUND OF THE INVENTION

1. Field of Invention

The present invention relates generally to the field of computerized packaging of vendor products. More specifically, the present invention is related to an e-commerce method and system for dynamically formulating searchable travel packages and allowing vendors to control inventory by offering products with restrictions.

2. Discussion of Prior Art

Vendors of travel-related products, like airlines, hotels and rental car companies have developed Revenue Management Systems (RMS) to optimize their revenue for their respective products (flights, hotel rooms per night, and rental cars per day). Revenue management can be separated into two distinct parts: pricing and inventory management. Pricing involves the establishment of fare classes and tariffs within those classes for each product. The objective of each vendor is to sell as much as possible without allowing the discount fare leisure passengers enjoy as a result of their flexibility, to dilute high yield and/or business passengers.

A package, also known as a tour package, is a collection of travel-oriented products, for example an airline ticket, a hotel room, a rental car, a ticket to a theme park, or a ticket to a rock concert. Travel packages are currently being "assembled" by travel agents and sold as a single product to consumers. Packages are attractive to travelers because they are easier to choose, and because in most cases packages have cheaper prices than buying the components separately.

Packages are appealing to vendors too. Since the price of each component in the package is not visible to the traveler, a package can be used to offer discounted prices on inventory that cannot be sold for the regular price, without publishing the fact that there is a discount, or how big it is. Packages can be restricted in ways that will "fence out" business travelers, for example by making packages non-refundable, or by requiring an overnight stay during the weekend. Since travel agents make most packages, the vendors have currently little control on "fencing out" business travelers or on other components of the package that they participate in.

Packages that are assembled by a travel agent are available only for travelers that go to the specific travel agent, or to its partners who get information about the package.

The following references describe known travel management systems.

Flake et al. (U.S. Pat. No. 5,832,451), assigned to Electronic Data Systems Corporation, provides for an *Automated Travel Service Management Information System*. This reference discloses an automated travel management information system that incorporates available customer reservation service information into one database. The vendor relations component includes such functions as developing relationships with various travel services vendors, such as airlines and hotels.

Lynch et al. (U.S. Pat. No. 5,839,114), assigned to Electronic Data Systems Corporation, provides for an *Automated System for Selecting an Initial Computer Reservation System*. This reference discloses an automated system that optimizes the hits-to-bookings ratio of CRSs utilized by a travel agency, by predicting which CRS will most likely be used to book travel arrangements in response to any given request by a customer. Also, a traveler portfolio and a business entity portfolio are included in the relational database system, respectively, for each individual and business travel customer of the agency.

DeLorme et al. (5,948,040), assigned to DeLorme Publishing Co., provides for a *Travel Reservation Information and Planning System*. This reference discloses a database capable of determining, reserving, and/or ticketing locations along a travel route between a user-selected travel origin and travel destination, including user-selected waypoints of interest along the way.

Lynch et al. (U.S. Pat. No. 6,018,715), assigned to Electronic Data Systems Corporation, provides for an *Automated Travel Planning System*. This reference discloses an automated system that generates a recommended travel plan or policy that balances between the preferences of an individual traveler, a business entity employing the traveler, and a travel agency. A travel agent using the system does not need to manually derive a travel plan or policy that is satisfactory to each of the travelers, the business entity, and the travel agency.

Walker et al. (U.S. Pat. No. 5,897,620), assigned to priceline.com Inc., provides for a *Method and Apparatus for the Sale of Airline-Specified Flight Tickets*. This reference demonstrates how an airline is able to fill otherwise empty seats in a manner that stimulates latent and unfulfilled leisure travel demand while leaving their underlying fare structures intact.

Homick (U.S. Pat. No. 5,270,921), assigned to Andersen Consulting, provides for *Virtual Fare Methods for a Computerized Airline Seat Inventory Control System*. This reference discloses an airline seat reservation system that produces optimal network-wide seat inventory controls while taking into account probabilistic nature of demand. The total fare paid by a passenger using the leg is adjusted by taking into account an estimate of the displacement cost of the travel on the other legs of the itinerary to create a virtual fare.

Garback (U.S. Pat. No. 5,237,499) provides for a *Computer Travel Planning System* to process travel requests directed to specific venue from individual members of a sponsored group.

Tagawa (U.S. Pat. No. 5,732,398), assigned to Keyosk Corp., provides for a *Self-Service System for Selling Travel-Related Services or Products*. An interactive travel service system functions like an agent to assist a user.

Lynch et al. (WO 97/32268) provides for an *Automated System for Identifying Alternate Low-cost Travel Arrangements*. The system obtains inventory information and travel agency information to assist in identifying low-cost options.

The following products identify Internet travel products:
BookIt! PRO
Worldspan
ByeByeNow.com
IntenetView 2.0
Genesys—The Travel Technology Consultancy
Affinity Solutions
NTS Travel Response
IONA Pressroom
S2SystemsNews Whatever the precise merits, features and advantages of the above cited references, none of them achieve or fulfills the purposes of the present invention.

One object of the present invention is to provide a system and method whereby packages of travel-related products can be automatically built and sold.

In accordance with one aspect of the invention, there is provided a system and method for defining products, prices, availability, and packaging restrictions by each vendor.

In accordance with another aspect of the invention, there is provided a system and method for automatically matching products according to multiple parameters, and automatically generating a package.

In accordance with another aspect of the invention, there is provided a system and method for receiving and processing of a request to search for packages according to a set of parameters; for receiving and processing of a request to check availability of packages and for receiving and processing of a request to purchase packages.

Thus, the embodiment of the present invention provides vendors of travel-related products with the flexibility necessary to fill potentially thousands of airline seats, hotel rooms or cars that would have otherwise remained empty each day. The embodiment also provides business travelers with an easier way to find in a single place all of the services they need for a business trip. Further aspects of the present invention will become apparent during the course of the following description and by reference to the attached drawings.

These and other objects are achieved by the detailed description that follows.

SUMMARY OF THE INVENTION

A centralized travel packaging system retrieves available vendor offered travel products from airline, hotel, car rental companies, etc., as well as associated pricing, time restrictions, use restrictions, class, availability, rules, and description(s). Travelers, agents and distributors search the centralized travel packaging system for possible package matches based on the traveler's criteria. The system compiles packages either in advance or interactively with the requestor using an intelligent matching mechanism retained within the centralized travel packaging system. The matching method uses requestor criteria and additional criteria such as geographic distributions, type of product, time considerations, cost, defined restrictions, expert travel packaging knowledge base, and distribution channel limitations to match vendor offered travel products. Upon selection of a package, the system processes the request for purchase to include cost determination, commission schedules and payment. Packages are reformulated if offered products become unavailable or restrictions or traveler criteria change.

BRIEF DESCRIPTION OF THE DRAWINGS

FIG. 8 illustrates the processes of accepting a new offer for a travel product.

FIG. 10a illustrates a series of steps performed to search for packages.

DESCRIPTION OF THE PREFERRED EMBODIMENTS

Figure 1:
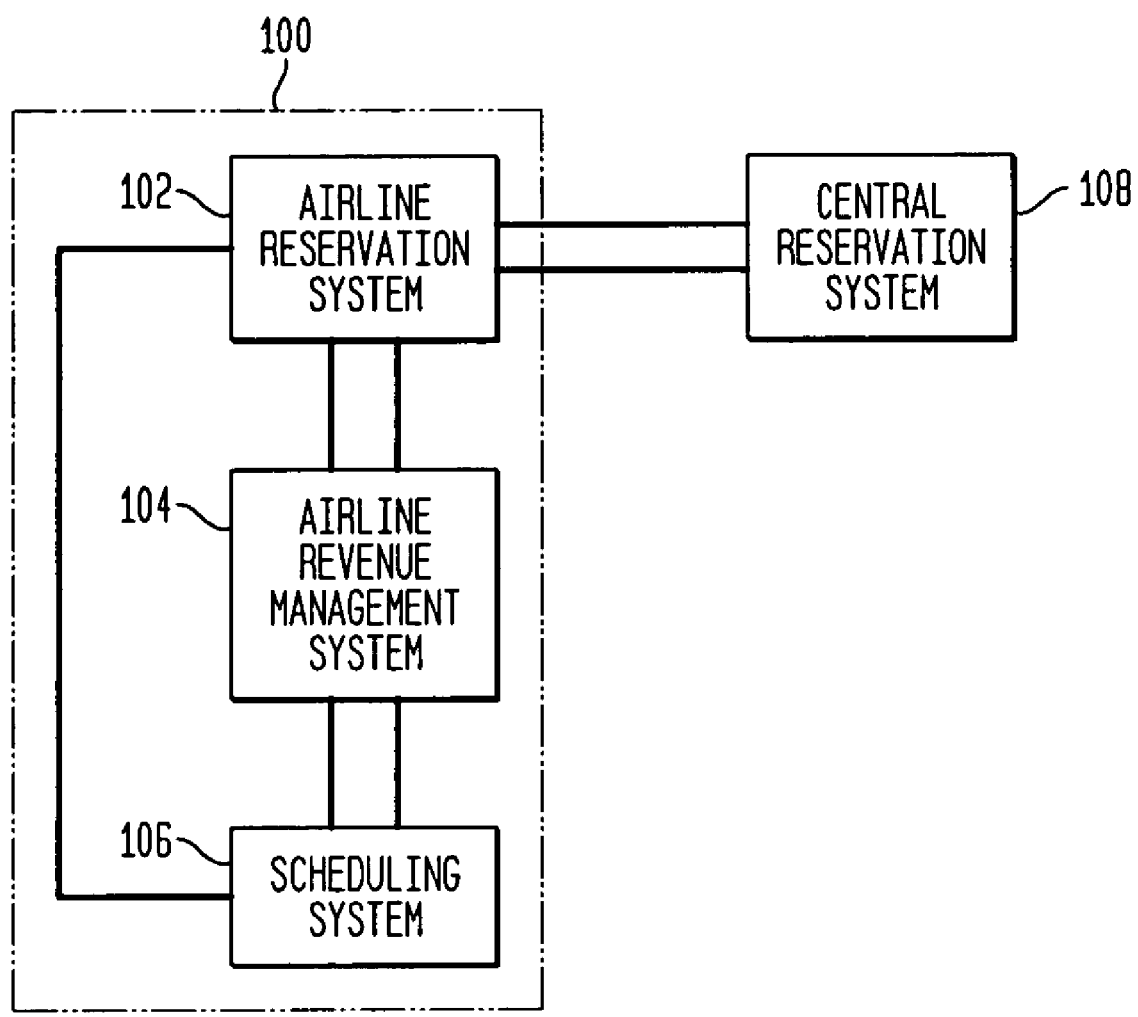
FIG. 1 is a block diagram illustrating a typical airline reservation and revenue systems.

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications of the materials for its construction and is not intended to limit the invention to the embodiment illustrated. Those skilled in the art will envision many other possible variations within the scope of the present invention.

FIG. 1 illustrates a block diagram of a typical airline reservation and revenue system 100. As shown, an airline's revenue management system (ARMS) 104 analyzes historical demand and pricing data for previous flights along a specific route during the relevant time period, to determine the number of actual flights to offer for a specific route on a specific day. Once this determination is made, the ARMS instructs the airline's system to create the actual flights. The ARMS also instructs the scheduling system 106 to create a special airline fare listing for the same flights on the same day. The term "airline special fare listing" is used herein as a listing in the Airline Reservation System (ARS) 102, Central Reservation System (CRS) 108 or the like for which a traveler may purchase a package that includes the specific flight. Throughout the specification and claims, the term CRS can be substituted for specific internal reservation systems without departing from the scope of the present invention. The airline scheduling system 106 creates both the actual flights and the airline special fare listing, as instructed, and transmits the scheduling information to the ARS 102.

Figure 4:
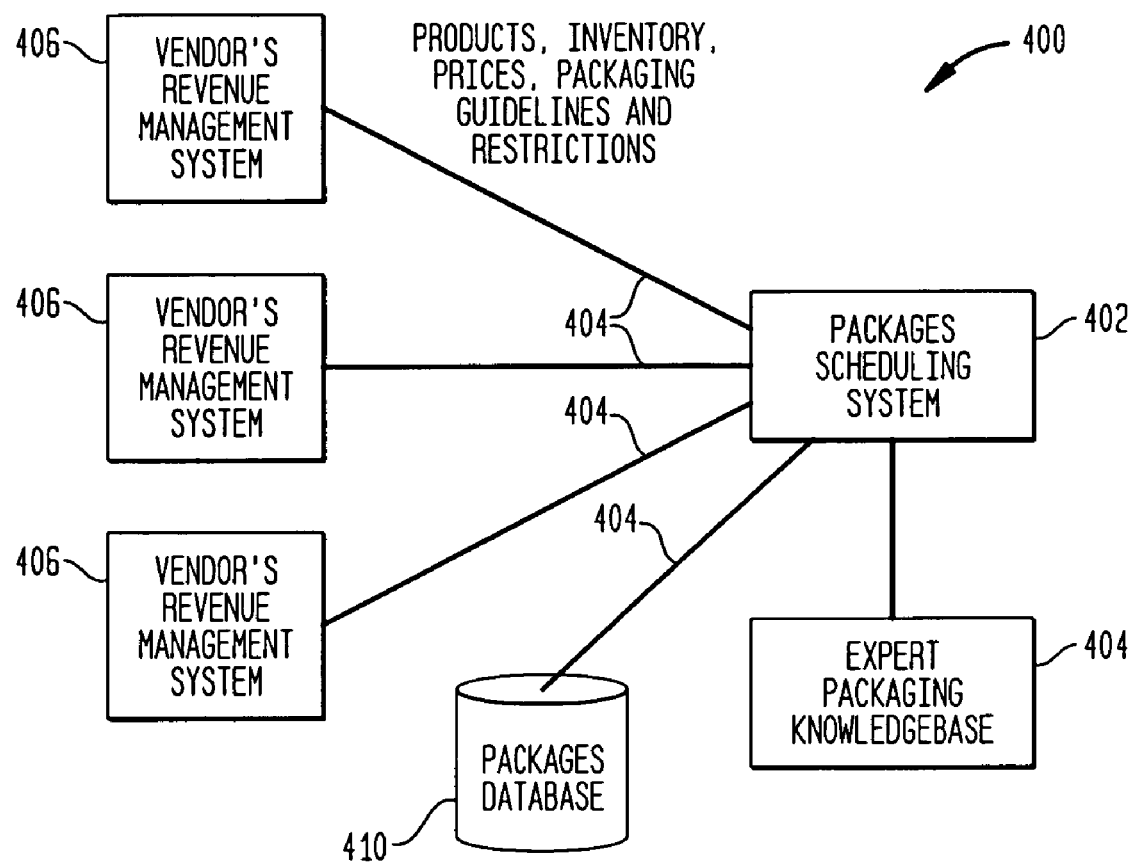
FIG. 4 depicts a block diagram of information that is sent to the packages scheduling system (PSS) from multiple vendors.

The ARMS 104 also establishes a plurality of fare classes for the actual flights, utilizes historical data to forecast an expected demand over time for tickets within a given fare class at a given price, and initially allocates and prices inventory sufficient to satisfy the expected demand. The ARMS transmits this inventory and pricing information to the ARS. As is well known in the art, the ARMS can predict, based on available historical data, whether the airline will have empty seats on a given flight. Based on this information, and on additional information like the time left before an actual flight, the ARMS can determine an airline special fare/class for the seat when included in packages. The airline special fare/class can be lower than the available (regular) fare/class, when selling the flight in packages is targeted to attract leisure travelers to fill seats that would otherwise be empty. The airline special fare/class can be higher than the available fare/class when selling the flights in packages is targeted to improve service for business travelers who prefer to find a complete set of products, for example a flight combined with a hotel room for a conference. The ARMS transmits information on the inventory and pricing for the airline special fare listing to the present invention packages scheduling system (PSS) 402 as shown in FIG. 4.

The ARMS will monitor the actual demand with each fare class relative to the forecasted demand to dynamically reevaluate the inventory allocated to both the actual flights and the airline special fare listing. In accordance with the actual demand, the ARMS 104 will allocate additional inventory, lower the fare/class, reduce or eliminate the inventory or increase the fare/class. For any such change, the ARMS will transmit the new inventory and price/class to the PSS 402. The ARMS can send the PSS only the packaging rules in cases where the pricing and availability can be automatically retrieved by the PSS using a connection to a price availability system like a CRS.

The airline will transmit to the PSS 402 a set of packaging guidelines and restrictions that apply for building packages that include the products of the specific airline. Several sets of such rules may be defined for each airline. When the ARMS 104 transmits information on inventory or price/class for flight seats that may be packaged, it also transmits information on packaging guidelines and restrictions that the packages that include the specific flight seats must adhere to. Such guidelines and restrictions can be the minimal or maximal duration of travel, required days of the week, preferred partners, excluded partners as well as other limitations directed to travel parameters. The various types of packaging guidelines and restrictions are further discussed hereafter. Using these guidelines and restrictions, the airline has an option to control parameters of the packages to "fence out" high yield business travelers.

Figure 2:
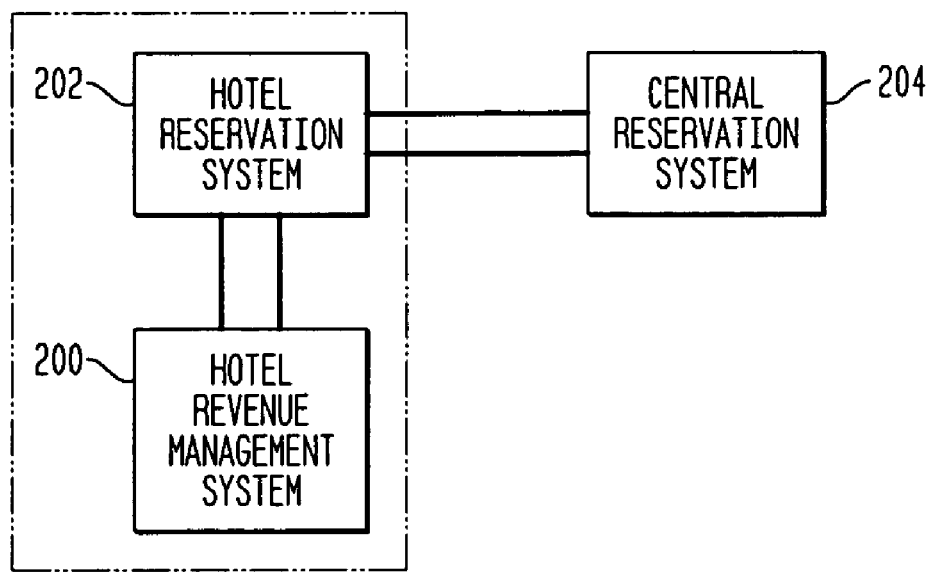
FIG. 2 is a block diagram illustrating a typical hotel reservation and revenue systems.

As shown in FIG. 2, a hotel's revenue management system (HRMS) 200 analyzes historical demand and pricing data for previous nights during the relevant time period for each specific room type. The HRMS 200 establishes a plurality of rate codes for the actual room types, utilizes historical data to forecast an expected demand over time for rooms within a given rate code-at a given price, and initially allocates and prices inventory sufficient to satisfy the expected demand. The HRMS 200 transmits this inventory and pricing information to the hotel reservation system HRS 202. As is well known in the art, the HRMS 200 can predict, based on available historical data, whether the hotel will have empty rooms on a given day. Based on this information, and on additional information, such as membership of traveler in loyalty programs, contracts and partnerships between vendors, discount rates for specific traveler groups like corporate travelers, and the like, the HRMS 200 can determine a special rate/code for the room when included in packages. The special rate/code can be lower than the available (regular) rate/code when selling the room in packages is targeted to attract leisure travelers to fill rooms that would otherwise be empty. The special rate/code can be higher than the available rate/code when selling the rooms in packages is targeted to improve service for business travelers who prefer to find a complete set of products, for example a flight combined with a hotel room for a conference. The HRS 202 transmits information on the inventory and pricing for the hotel special rate listing to the CRS 204 as well as packages scheduling system (PSS) 402, as shown in FIG. 4. It can send the PSS only the packaging rules, in cases where the pricing and availability can be automatically retrieved by the PSS using a connection to a price availability system, like a CRS.

The HRMS 200 will monitor the actual demand with each rate class relative to the forecasted demand to dynamically reevaluate the inventory allocated to both the room and the special rate listing. In accordance with the actual demand, the HRMS 200 will allocate additional inventory, lower the rate/code, reduce or eliminate the inventory or increase the rate/code. For any such change, the HRMS 200 will transmit the new inventory and price/class to the CRS 204 as well as PSS 402.

The hotel will transmit to the PSS 402 a set of packaging guidelines and restrictions that apply for building packages that include the products of the specific hotel. Several sets of such rules may be defined for each hotel. When the HRMS 200 transmits information on inventory or price/class for rooms that may be packaged, it also transmits information on the packaging guidelines and restrictions to which the packages that include the specific room must adhere. Such guidelines and restrictions can be the minimal or maximal duration of travel, required days of week, preferred partners, excluded partners as well as other limitations directed to travel parameters. The types of packaging guidelines and restrictions are further discussed hereafter. Using these guidelines and restrictions, the hotel has an option to control parameters of the packages to "fence out" business travelers.

Figure 3:
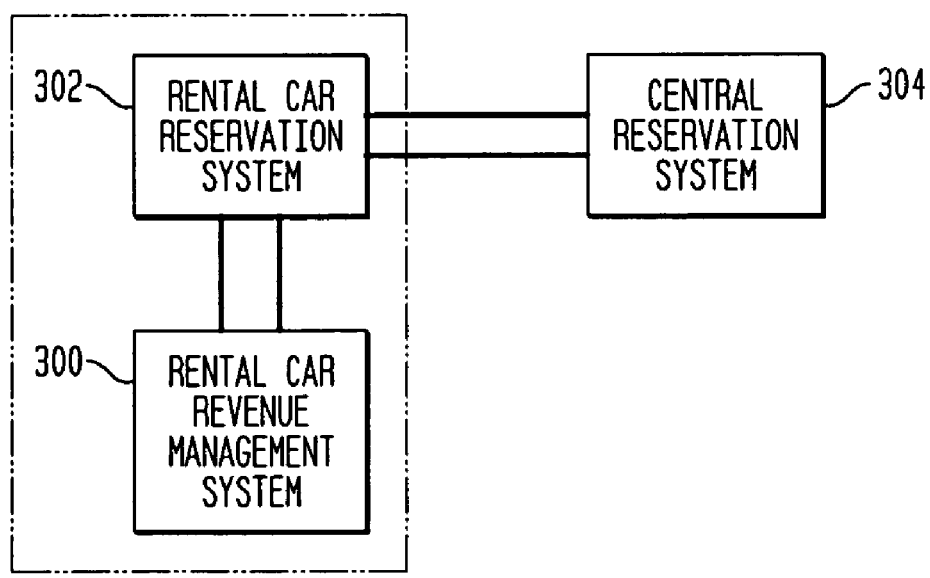
FIG. 3 is a block diagram illustrating a typical rental car reservation and revenue system.

As shown in FIG. 3, a rental car company revenue management system (RCMS) 300 analyzes historical demand and pricing data for previous reservations during the relevant time period for each specific car type. The RCMS 300 establishes a plurality of rate/code classes for the actual car classes, utilizes historical data to forecast an expected demand over time for cars within a given rate code at a given price, and initially allocates and prices inventory sufficient to satisfy the expected demand. The RCMS 300 transmits this inventory and pricing information to the rental car reservation system RCRS 302. As is well-known in the art, the RCMS 300 can predict, based on available historical data, whether the company will have unused cars on a given day. Based on this information, and on additional information, such as membership of traveler in loyalty programs, contracts and partnerships between vendors, discount rates for specific traveler groups like corporate travelers, and the like, the RCMS 300 can determine a special rate/code for the car class when included in packages. The special rate/code can be lower than the available (regular) rate/code, when selling the car in packages is targeted to attract leisure travelers to use cars that would otherwise be left unused. The special rate/code can be higher than the available rate/code when selling the cars in packages is targeted to improve service for business travelers who prefer to find a complete set of products, for example a flight combined with a hotel room and car for a conference. The RCRS 302 transmits information on the inventory and pricing for the hotel special rate listing to the CRS 304 as well as packages scheduling system (PSS) 402, as shown in FIG. 4. It can send the PSS only the packaging rules, in cases where the pricing and availability can be automatically retrieved by the PSS using a connection to a price and availability system, like a CRS.

The RCMS 300 will monitor the actual demand with each rate code relative to the forecasted demand to dynamically reevaluate the inventory allocated to both the car class and the special rate listing. In accordance with the actual demand, the RCMS 300 will allocate additional inventory, lower the rate/code, reduce or eliminate the inventory or increase the rate/code. For any such change, the RCMS 300 will transmit the new inventory and price/class to the RCRS 302, CRS 304 as well as PSS 402.

The rental car agency will transmit to the PSS 402 a set of packaging guidelines and restrictions that apply for building packages that include the products of the specific rental car agency. Several sets of such rules may be defined for each agency. When the RCMS 300 transmits information on inventory or price/class for cars that may be packaged, it also transmits information on the packaging guidelines and restrictions that the packages that include the specific room must adhere to. Such guidelines and restrictions can be the minimal or maximal duration of travel, required days of week, preferred partners, excluded partners and more. The types of packaging guidelines and restrictions are further discussed at a later section of this document. Using these packaging guidelines and restrictions, the rental car company has an option to control parameters of the packages to "fence out" business travelers.

As shown in FIG. 4, the packages scheduling system (PSS) 402 receives information on products, inventory, prices and packaging guidelines and restrictions from multiple vendors 406. Connections between the various components of the present invention and the PSS 402 include, but are not limited to, computer-based networks, LANs, WANs, cellular, wireless, Internet, WWW, satellite, or other data/telecommunications based communication mediums.

Each company (vendor) 406 defines it's own packaging guidelines and restrictions to control the packages that may be generated using the products of the respective vendor.

Packaging restrictions can be based on the types of products packaged, for example an airline may define that each package that include its flights must include a hotel room.

Packaging restrictions can be based on the specific companies that provide additional products or services within the same package: restrict specific companies from being packaged together or allow only specific companies to be packaged together.

Packaging restrictions can be based on the price of individual items within the package, or on the total price of the package. Price restrictions can also be based on the relative part of each vendor in the package (e.g. "I am not willing to put my products in a package if my products are more than 80% of the entire package price")

Packaging restrictions can be based on the days of the week that are included within the travel duration, that start the travel duration or that end the travel duration. Using this type of restriction, vendors can (for example) enforce that weekend days are part of the travel, which is likely to "fence out" business travelers who prefer to return home for the weekend.

Packaging restrictions can be based on traveler's information, the number of traveling people, the number of accompanying children, and personal information on the traveler like membership and credit in loyalty programs (e.g. frequent flyer programs), or previous purchases of the traveler.

Packaging restrictions can be based on the amount of time between the purchase and actual travel time (e.g. "do not package my products less than 3 days before departure")

Packaging restrictions can be based on payment terms and conditions, (e.g. "do not package my products unless the traveler agrees that refunds will not be accepted")

As shown in FIG. 4, the packages scheduling system (PSS) 402 also receives information defined by packaging experts and is stored in a knowledge base 408. The information in the knowledge base is used by the system to classify geographical locations to types of activities (e.g. Aspen, Colo. has Ski facilities between December and April each year). The information in the knowledge base also includes information about proximity between locations (e.g. that a hotel in Goleta, Calif., is nearby the airport in Santa Barbara, Calif., and therefore a package of the 2 may be built).

The PSS 402 generates all of the packages that can be generated by combining products of various vendors 406, and that the combination adheres to the restrictions and guidelines specified by all respective vendors. Packages are generated automatically and are stored in the packages database 410. Changes that are made by a vendor to the inventory or prices of products that participate in packages, or changes to the packaging restrictions of a vendor, automatically trigger a process of removing all packages that are no longer valid, and adding any new packages that become valid.

Figure 5:
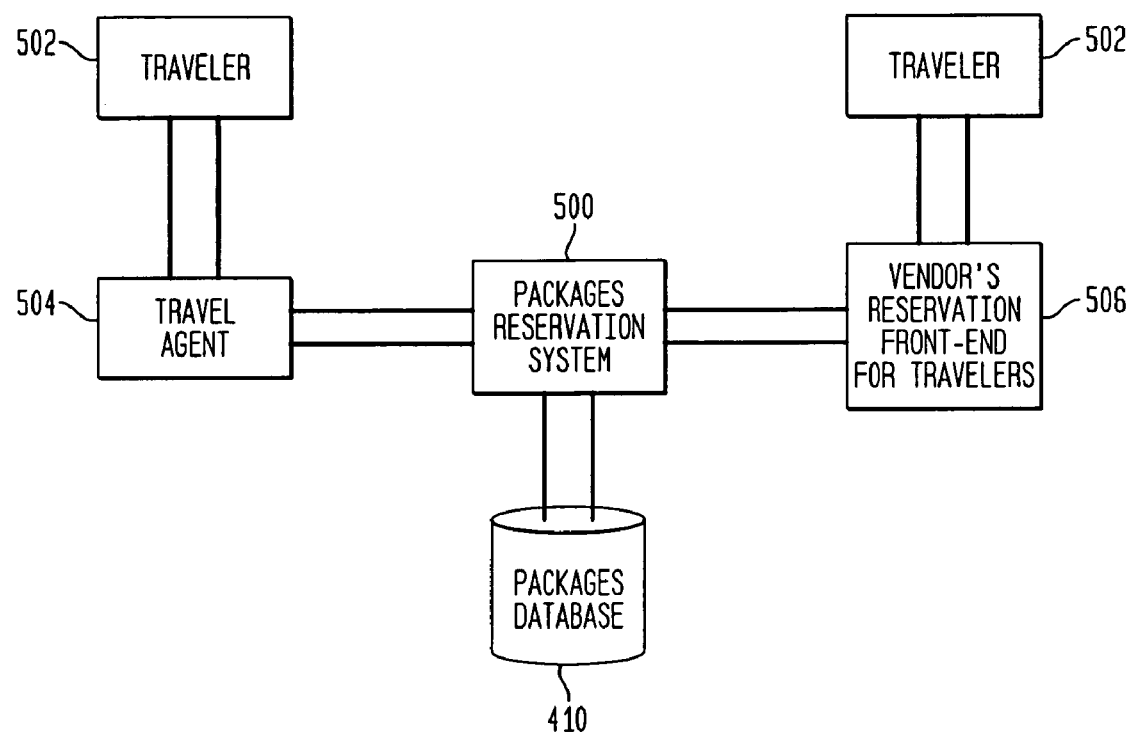
FIG. 5 illustrates the components that handle a traveler's request for information on packages.

As shown in FIG. 5, a traveler 502 contacts his travel agent by way of phone, fax, online connection, e-mail, in person or equivalents, and provides the travel agent 504 with information regarding a specific origin, destination, types of requested services, number of travelers and ages, preferred price range, travel dates, etc. The travel agent connects to the Packages Reservation System (PRS) 500 which is operationally connected to or made part of the PSS 402 and searches for packages that satisfy the requirements of the traveler. As a result, a list of suitable packages, and for each package the information on the products included within the package, is shown to the travel agent 504 or traveler 502. The total price of the package is displayed, while the price of each product within the package is not displayed, and is not accessible to the travel agent or traveler.

The travel agent can book the package through the PRS 500 and receive a confirmation code for the entire package, and confirmation codes for each product within the package.

The same information and facilities that are provided to travel agents will be provided for airlines, hotels, rental car companies and other vendors that offer products to be packaged. Using these facilities, searching for packages and booking of packages can be also done by the vendors using any front-end 506 the vendor has for accepting travelers reservations (e.g. phone call-center or web-site).

The same package can be sold to travelers through multiple distribution channels like travel agents, vendors, and electronic travel agents. Each distribution channel can define selling options to control what packages can be sold through the specific distribution channel, and special parameters for selling packages through the specific distribution channel. The selling options include: packages of which specific companies may be sold; packages of which specific companies may not be sold, how much should be added to the price as markup/commission, limits on duration of travel, limits on location of travel, and limits on the price of the package. The commission of the distribution channel can be defined as an absolute value (e.g. $5) or relative to the price of the package (e.g. 6%).

Figure 6:
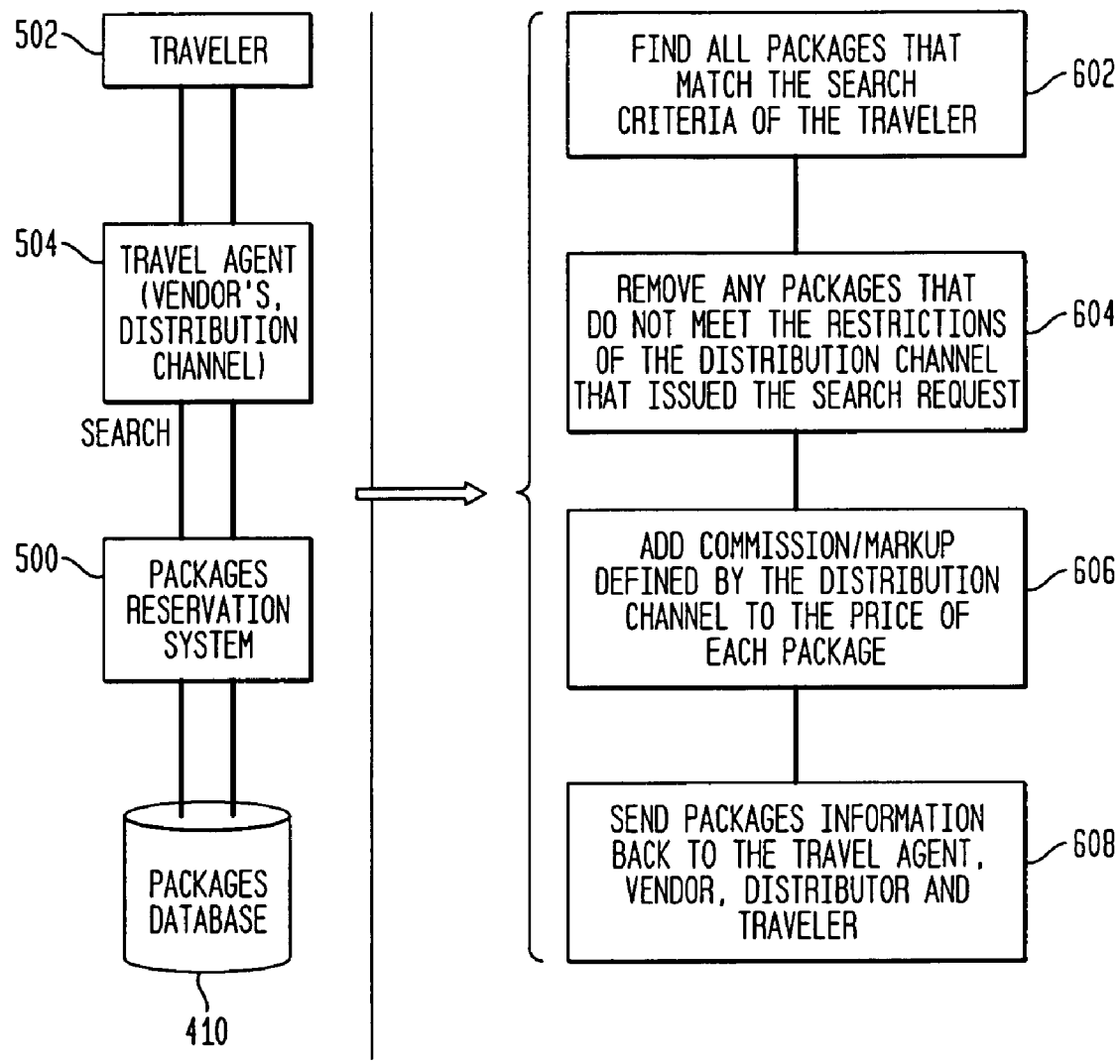
FIG. 6 illustrates the process of filtering packages that match the traveler's request.

As shown in FIG. 6, when a travel agent 504 or a vendor searches the PRS 500 for packages, only packages that meet the restrictions of the specific distribution channel will be shown, and the price shown will include the commission defined by specific distribution channel. The system finds all packages that match the search criteria of the traveler 602, removes any packages that do not meet the restrictions of the distribution channel that issued the search request 604, adds the commission/markup defined by the distribution channel to the price of each package 606, and sends package information back to the travel agent, vendor, distributor and traveler 608.

Figure 7:
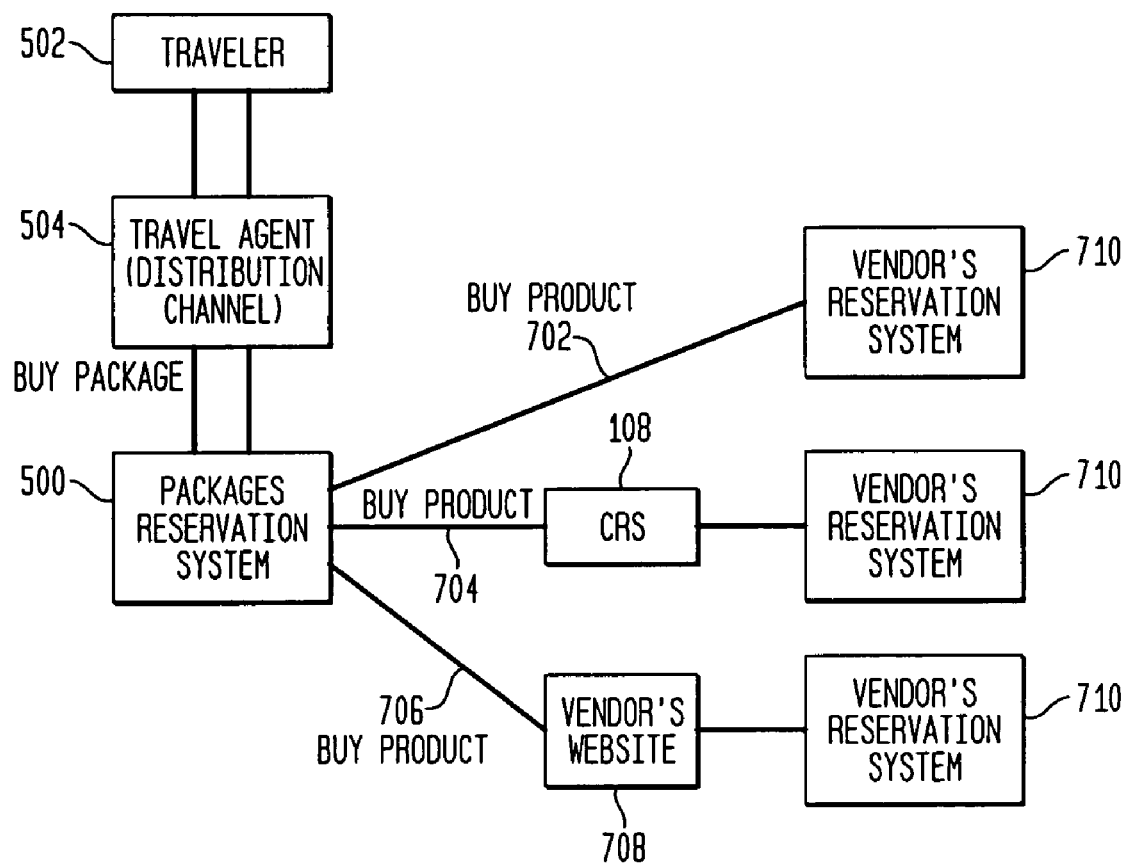
FIG. 7 illustrates the processes of making a reservation and purchasing a package.

As shown in FIG. 7, when a travel agent books a package through the PRS 500, the PRS sends a booking message to the reservation system 710 of each of the vendors participating in the purchased package. The reservation message can be sent directly 702 to the reservation system of the vendor, or through some gateway that will relay the message to the reservation system. Examples for such gateways are Central Reservation Systems (CRS) 704, or web sites of vendors 708.

As shown in FIG. 8, steps 802, 804 and 806 illustrate a flow if a new product is offered to the Packaging Scheduling System (PSS) 402 with information about the type of product (e.g. double room at the Empire hotel in Goleta, Calif.), the price of the product, the available inventory, and the packaging restrictions.

In step 802, a location code is computed for the hotel. A location is a geographical region that within it products can be packaged. For example, the airport code of Santa Barbara, Calif. will have the same location as the above hotel, even if the cities are different. Computing the location code is performed based on a table address, or geographical coordinates, and on rules defined to the system to prevent matching products that are near but across borders of two countries.

In step 804, a set of possible activities is computed and attached to the product. Activities may be defined for the specific product (e.g. the specific hotel has a swimming pool) or for the location (there is a beach nearby city).

In step 806, the system categorizes each product to be a main product or an optional product. Main products are considered as the main components of the package, and are initially added to the contents and prices of packages. Examples for main products are airline flights, hotel rooms and rental cars. Optional products are products that are offered to the consumer as additional and optional parts of the package, for example, transportation from the airport, or a ski-pass. The decision if a product is main or optional depends also on the attributes of the location, for example, in places where driving conditions are poor, a car may be considered as optional, while in other locations a car may be considered as a main product.

Figure 9A:
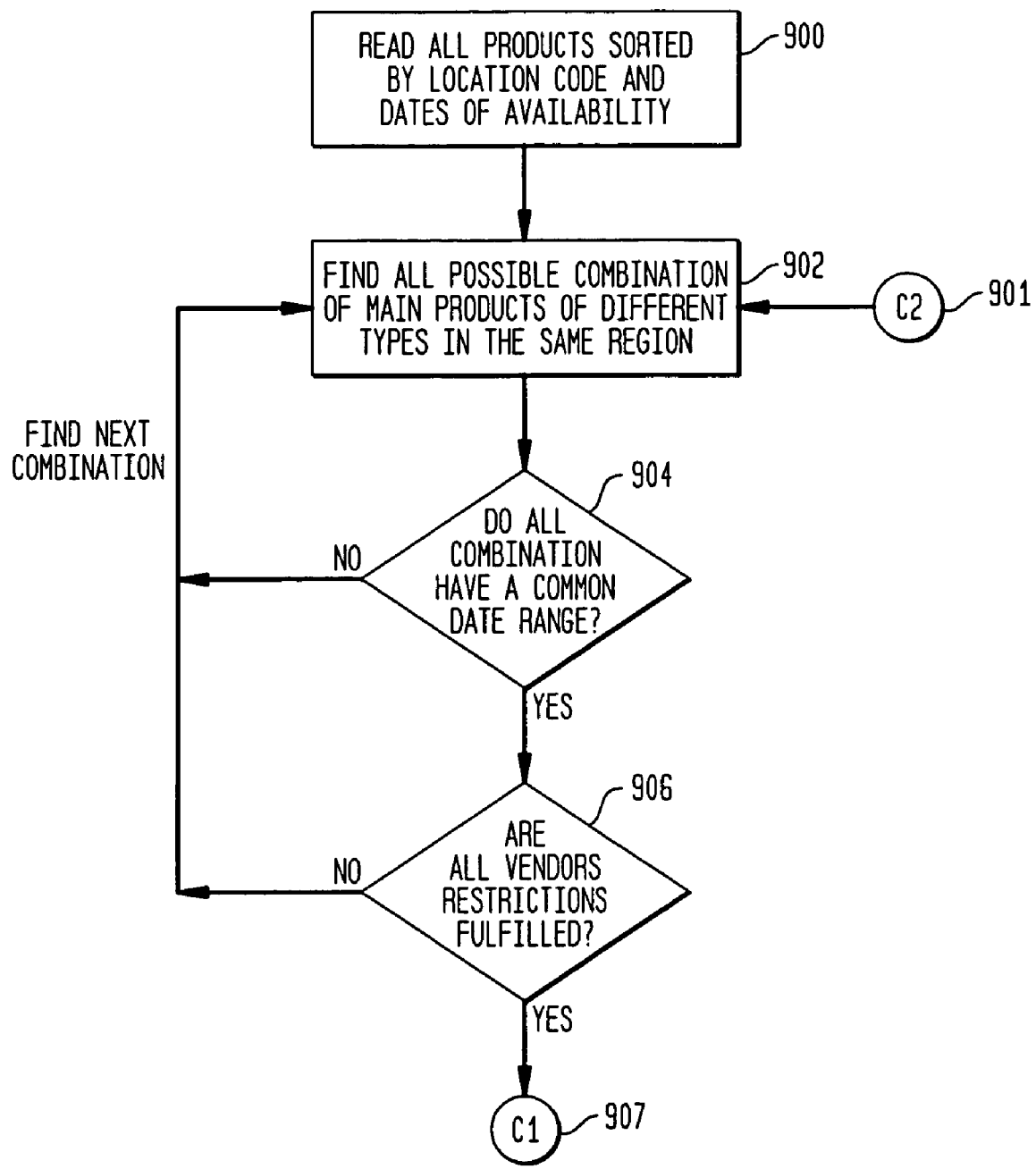
FIGS. 9a and 9b, collectively, illustrate an algorithm for building packages.
Figure 9B:
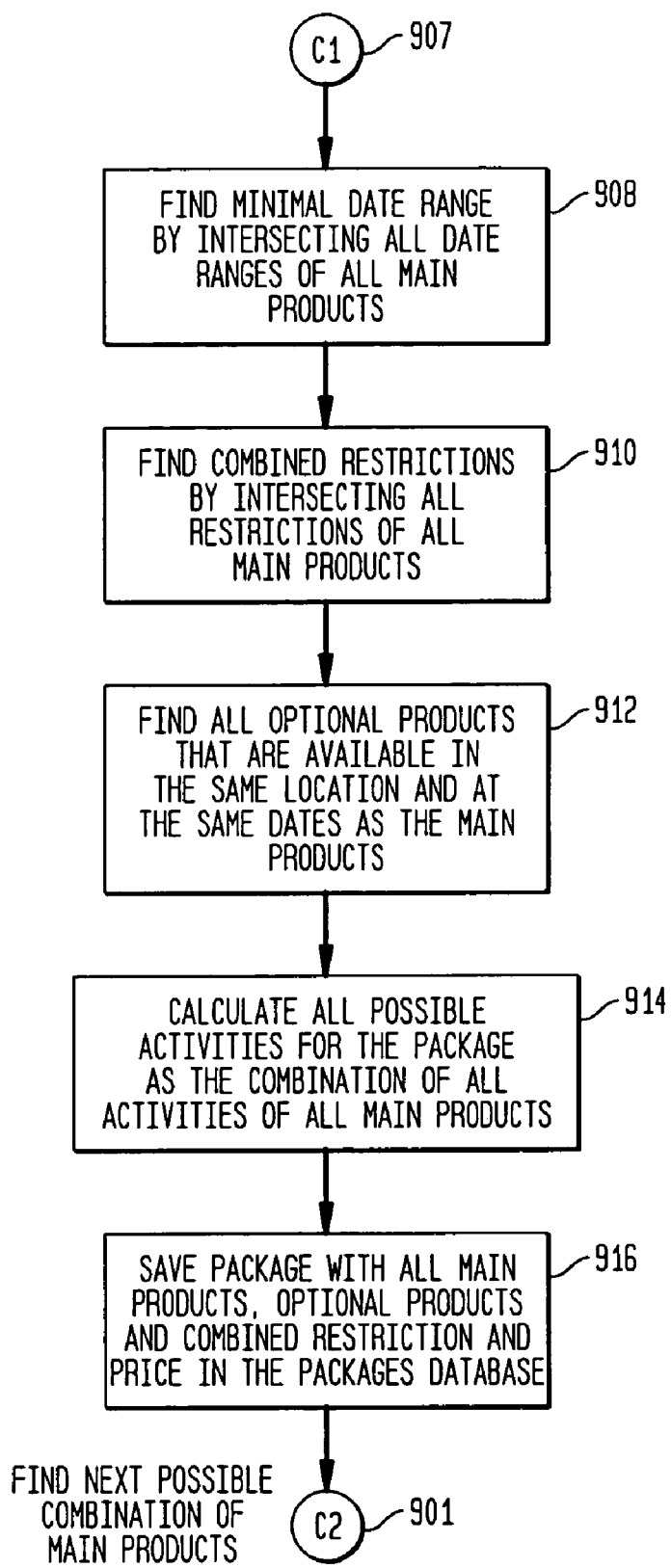

FIGS. 9*a* and 9*b*, collectively, illustrate an algorithm for building packages. As shown in FIG. 9*a*, in step 900, all available products are read, sorted by the location code that was computed in step 802. This scan will produce all products the can be matched based on having the same location, and near dates.

In step 902, all combinations of main product are generated, by selecting each product that is main and trying to match it with other main product of different types (e.g. match a hotel room with car, but not with another hotel room)

In step 904, for each combination generated by step 902, the intersection of all availability dates of all products is computed and tested if it is empty or not. If the combination is not empty, then all products have a common date range and therefore can be sold as a package.

In step 906, the restrictions on each product are checked to verify that other products do not violate these restrictions, for example that the vendors of two products agree to be packaged together.

FIG. 9*b* connected by C1 907, illustrates the remainder of the flowchart, in step 908, the minimal date range is computed as the value computed in step 904, intersected with any additional restrictions of the vendors of the products of the package. For example, if a vendor defined that its product cannot be used on weekends, and the computed date range starts or ends in a weekend day, the date range will be reduced to remove the weekend days.

In step 910, all restrictions of all respective vendors are combined to generate the restrictions set of the entire package.

In step 912, all optional products that are available at the same location and at the same date range are added to the package and are marked as optional components.

In step 914, all the activities that match any of the products are combined to generate the possible activities for the entire package. For example, if the hotel is a ski resort, and there is an ancient site in driving distance, and the package includes a car, then the combined activities are ski and archeology.

In step 916, the generated package is stored in the packages database 410.

The above algorithm can be run only on part of the products. When a new product is added, the above algorithm will match only the new product, while not matching again all products that have already been packaged. The steps are repeated 901 to find the next possible combination of main products.

As shown in FIG. 10*a*, step 1000, the consumer enters his/her requirements, specifically where, when, types of activities the consumer is interested in, required services (airline, car, hotel, theater, etc.), preferred companies and preferred price range. The search criteria can be entered directly by the consumer, for example in a web site, or by some intermediary, like a travel agent, or an airline call-center operator.

In step 1002, the system finds the location code that best matches the request of the consumer, using the same algorithm used in step 802. Several location codes may match the request of the consumer, for example, if there are several districts in the city to which the consumer is interested in going.

In step 1004, the system finds in the packages database all packages that match the consumer's location code, by comparing the package location code to the list of location codes computed in step 1002.

In step 1006, the system removes packages from the list generated in step 1004. Packages are removed from the list if they do not match the criteria issued by the consumer, like non-matching dates, of non-matching activities. Packages can also be removed if the package restrictions computed in step 910 restrict the specific consumer from using the package, for example a package is restricted for at least 2 travelers, while the consumer is looking for a package for a single traveler.

In step 1008, the final packaging is built out of the basic package information and additional information that was received from the consumer. The step is explained in more detail in FIG. 10*b*.

In step 1010, information on all packages that match the selection criteria of the consumer is sent to the consumer or the intermediary that issued the request in step 1000. If the list is large, it is sorted by consumer preferences or by system preferences, and is partially sent to the consumer with an option to receive additional parts of the list.

Figure 10B:
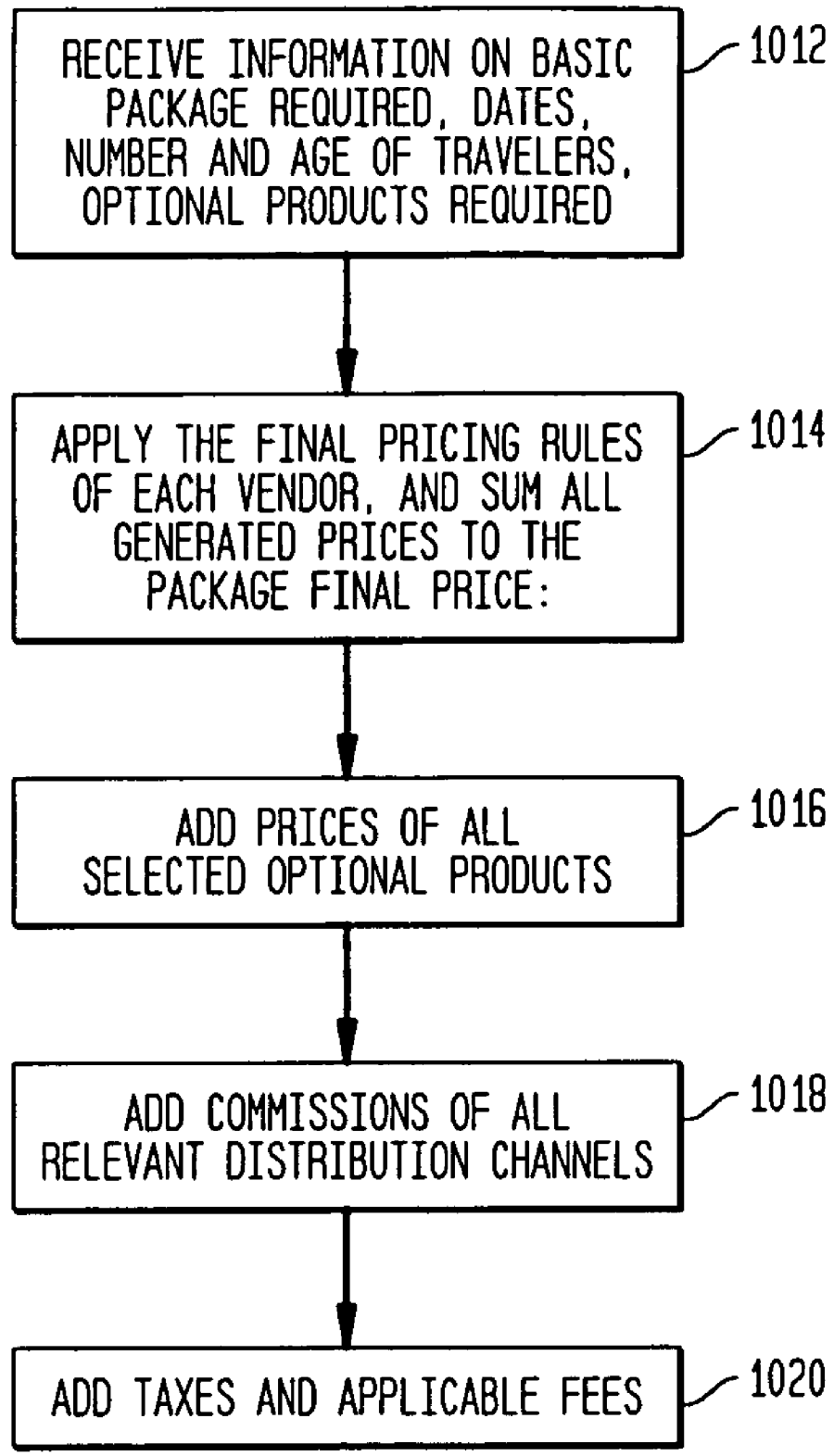
FIG. 10b illustrates a series of steps performed to illustrate the method of final packaging.

FIG. 10*b* illustrates a series of steps performed to illustrate the method of final packaging. In step 1012, information is received on the basic package required, dates, number and age of travelers, and optional products required. In step 1014, the final pricing rules of each vendor are applied and the sum of all generated prices to the package computed to determine the package final price. In step 1016, the prices of additional options are added. In step 1018, commissions of all relevant distribution channels are added to the price. In step 1020, applicable taxes and fees are added to create the final price.

Figure 11:
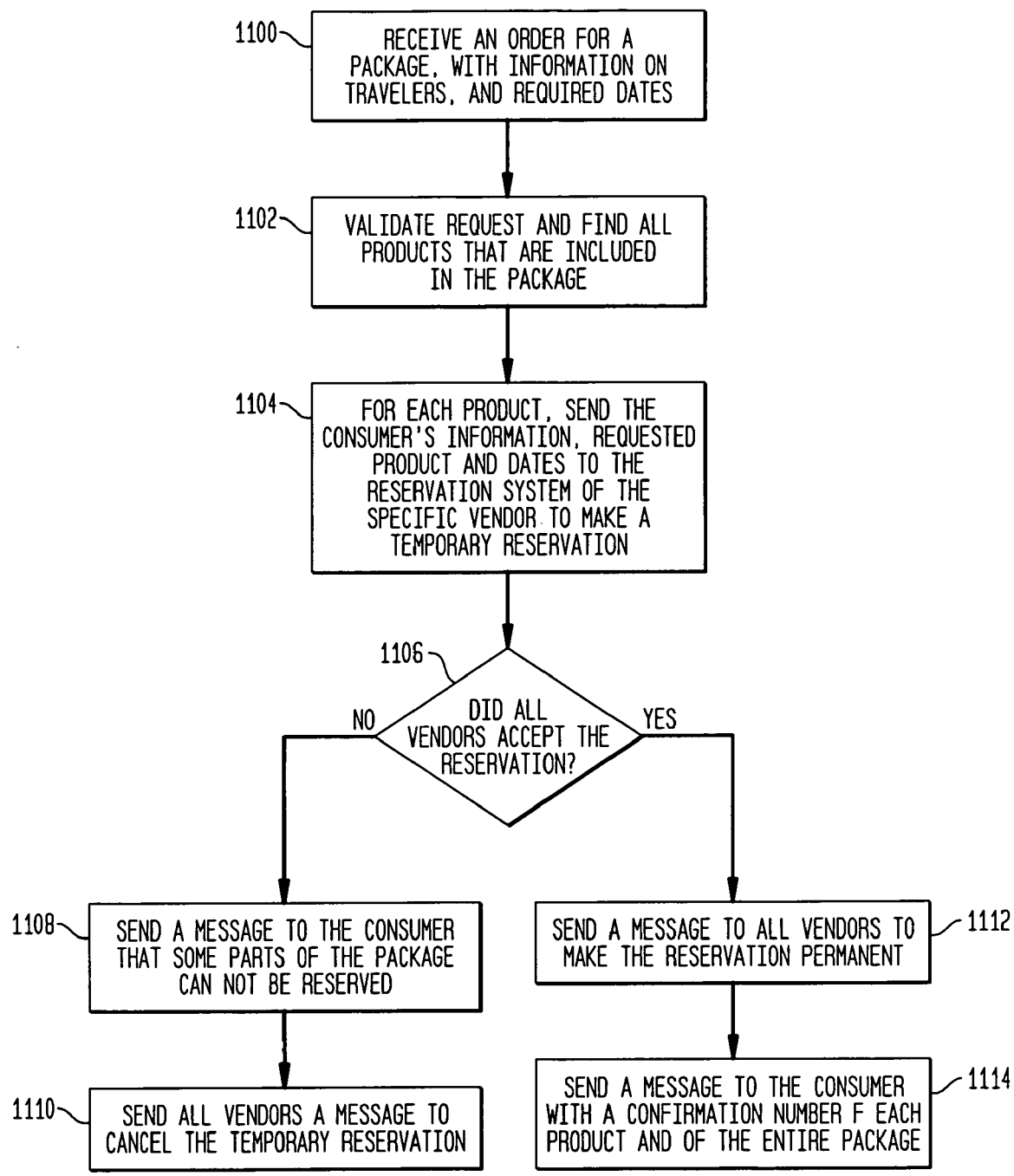
FIG. 11 illustrates the completion of the process to include purchase and fixing reservations.

FIG. 11 illustrates the completion of the process to include purchase and fixing reservations. As shown, step 1100, a request for a reservation for a specific package is received from the consumer, along with information about the consumer (like name, credit card number) the required dates and which optional products are requested. The reservation request can be entered directly by the consumer, for example in a web site, or by some intermediary, like a travel agent, or an airline call-center operator.

In step 1102, the consumer request is validated (the package exists and matched the requested dates) and a list of all the products and vendors that are involved in the package is found.

In step 1104, for each product a message is sent to the respected vendor to make a temporary reservation for the specific product for the specific consumer at the specific dates.

In step 1106, the system waits for a confirmation from all respective vendors. If all vendors can make the reservation, then in step 1112 the system sends messages to all vendors to make the reservation permanent, and sends conformation codes to the consumer in step 1114. If any vendor failed to make the reservation in step 1106, for example because the specific dates just recently went out of stock, then a message is sent to the consumer in step 1108 with detailed explanation of the problem, and with a list of alternative packages, and a message is sent to all vendors that made the temporary reservation in step 1110 to cancel the temporary reservation. If the error reserving the package was out-of-stock, the package will be marked as out-of-stock in the packages database so that it is no longer displayed to consumers.

EXAMPLES

In the following examples, the following companies are used:

SomeAirline: An airline company

SomeHotel: A hotel company, in San Francisco

SomeCar: A rental car company

SomeRestaurant: A restaurant

The System: The preferred embodiment of the described invention

Example 1

Due to a big computer conference in Las Vegas, the airline notices in advance that, while incoming flights to Las Vegas on the dates of the conference are fully booked, outgoing flights from Las Vegas, especially to San Francisco and to Seattle have a lot of vacant seats. An airline marketing representative with proper authorization logs-in to the system, and gives the system an offer for the outgoing flights of Las Vegas to San Francisco and Seattle at the conference dates at some discount price. The airline, which does not want to disclose the special price to consumers, instructs the system to combine the airline tickets with hotel rooms, and to sell the tickets at the special price only at the conference dates.

The hotel in Seattle offers rooms in the hotel in the regular consumer price to the system.

A marketing person in the rental car company notices that at the conference dates a lot of cars are not being ordered (many people left for the conference and there are less business visits to computer companies in the area.) Therefore, the car company representative enters into the system an offer for available cars at the specific dates.

The packages generator matches the airline tickets from Las Vegas to Seattle, with the hotel rooms and car at the same dates and generates a package. The price of the package is computed from the product price of each product within the package.

A restaurant in Seattle gives the system discount vouchers for 10%, to attract visitors to Seattle to go to the specific restaurant.

A couple from Las Vegas, who plan to visit Seattle, logs-in to the Internet and browses for a hotel in Seattle. They reach the web site of SomeHotel hotel, find their using the system, an option to book a roundtrip flight, hotel room, and a car for a bargain price. They decide to book the package using the system. When the package is purchased, the system makes the appropriate reservation at each of the vendors, by going directly to the vendor's system, or by using a Centralized Reservation System (CRS). The travelers received discount vouchers to the restaurant, and confirmation codes from the airline, hotel, and rental car company. The system transfers all the money from the traveler and transfers the relevant amounts to each vendor.

Example 2

The airline, wanting to increase its profit, enters a rule into the system that the price for a roundtrip ticket from one city to another city is $500. The rule also indicates that if the traveler chooses a luxury or sports car, then the airline ticket costs $560.

Travelers who will search the system for luxury cars will get higher prices, without knowing that some of the extra price goes to the airline. This way, the fact the price of each component is hidden can be used to increase the yield of the airline.

The above enhancements for an e-commerce method and system for dynamically formulating searchable travel packages and its described functional elements are implemented in various computing environments. One or more of the components and/or steps of the present invention are located/implemented locally or remotely. For example, the present invention may be implemented on a conventional IBM PC, mainframe, laptop computer or equivalent, multi-nodal system (e.g. LAN) or networking system (e.g. Internet, WWW). All programming and data related thereto are stored in computer memory, static or dynamic, and may be retrieved by the user in any of: conventional computer storage, display (i.e. CRT) and/or hardcopy (i.e. printed) formats. The programming of the present invention may be implemented by one of skill in the art of programming.

The invention claimed is:

1. A computer-based e-commerce method dynamically formulating a collection of vendor offered travel products, wherein said method comprises a plurality of steps, one or more of said steps performed locally or remotely, said method comprising:

retrieving two or more offerings of travel products from two or more vendors, said offerings including at least two product types selected from airline seating, hotel rooms, car rentals, and auxiliary travel support items with any of associated: price, time restrictions, use restrictions, class, availability, rules, and description(s);

retaining said two or more offerings of travel products in computer storage;

intelligently compiling travel packages comprising selected ones of said two or more offerings of travel products, each package including offerings of at least two product types, said compiling based on a congruency matching of defined restrictions and other criteria comprising any of geographic distributions, type of product, time considerations, cost, intelligent agents, and distribution channel limitations, wherein the defined restrictions for at least one product in a package are dependent on another product accepted in or excluded from the package;

receiving one or more search request(s) for possible packages;

presenting possible packages meeting a requesters criteria;

determining a total cost by any of: summation of individual costs of products included in said compiled package, commissions, discounts, and special promotional items, and processing payment of a one or more selected travel packages.

2. A computer-based e-commerce method dynamically formulating a collection of vendor offered travel products as per claim 1, further comprising the step of booking actual reservations with each vendor for products in a purchased package.

3. A computer-based e-commerce method dynamically formulating a collection of vendor offered travel products, as per claim 1, wherein said compilation is performed partially or wholly before said request for possible packages or interactively during said request.

4. A computer-based e-commerce method dynamically formulating a collection of vendor offered travel products, as per claim 1, wherein said method dynamically reformulates said compiled packages based on availability of said vendor offered products.

5. A computer-based e-commerce method dynamically formulating a collection of vendor offered travel products, as per claim 1, wherein said one or more steps performed locally or remotely are performed across any of: computer-based networks, LANs, WANs, cellular, wireless, Internet, WWW, satellite, or other data/telecommunications based communication mediums.

6. A computer-based e-commerce method for committing previously uncommitted travel products, wherein said method comprises a plurality of steps controlled by at least one processor, one or more of said steps implemented locally or remotely, said method comprising:

determining available travel products from an inventory, based on any of: historical data, price, class, demand, time before use, type;

placing defined restrictions on two or more of said determined travel products wherein the defined restrictions for at least one travel product are dependent on another travel product when the one product and the other product are offered in a travel package;

offering said two or more of said determined travel products with associated restrictions to a centralized travel packaging system, said centralized travel packaging system located across at least one of computer-based networks, LANs, WANs, and cellular, wireless, Internet, WWW, satellite-based communication mediums, receiving confirmed reservations from said centralized travel packaging system, said reservations included in one or more selected travel packages stored within a travel packages database as determined by an intelligent matching and dynamic compilation mechanism retained within said centralized travel packaging system, each package including two or more travel products of at least two product types, and wherein said uncommitted travel products are committed by acceptance of the confirmed reservations.

7. A computer-based e-commerce method for committing previously uncommitted travel products, as per claim 6, wherein said defined restrictions include any of: which companies may or may not be included in the packages, which other types of companies may or may not be included in the packages, minimal/maximal travel duration, minimal/maximal travelers, days of week that must be or must not be included in the travel duration, prices of other products in the package, discounts on other products in the package, or the relative part of each product in the package, available payment methods, conditions and restrictions for modifying the reservation or canceling the reservation, dynamic price of package according to any of: duration of stay, number of travelers, days of week, participating companies, geographical location.

8. A computer-based e-commerce method for committing previously uncommitted travel products, as per claim 6, wherein said centralized travel packaging system dynamically reformulates said compiled packages based on availability of one or more of said determined travel products.

9. A computer-based e-commerce method for previously uncommitted travel products, as per claim 6, wherein said centralized travel packaging system receives two or more of said determined travel products from a plurality of travel product vendors.

* * * * *